(12) United States Patent
Lindner et al.

(10) Patent No.: US 11,561,119 B2
(45) Date of Patent: Jan. 24, 2023

(54) INTERROGATION OF OPTICAL FIBER SENSOR NETWORKS

(71) Applicants: FBGS TECHNOLOGIES GMBH, Jena (DE); FBGS INTERNATIONAL NV, Geel (BE)

(72) Inventors: Eric Lindner, Jena (DE); Johan Vlekken, Diepenbeek (BE); Bram Van Hoe, Ghent (BE); Christian Voigtlander, Jena (DE); Jan Rene Van Roosbroeck, Hallaar (BE); Steffen Lochmann, Blankenfelde-Mahlow (DE); Andreas Ahrens, Dorf Mecklenburg (DE); Marek Gotten, Hontheim (DE)

(73) Assignees: FBGS TECHNOLOGIES GMBH, Jena (DE); FBGS INTERNATIONAL NV, Geel (BE)

( * ) Notice: Subject to any disclaimer, the term of this patent is extended or adjusted under 35 U.S.C. 154(b) by 3 days.

(21) Appl. No.: 17/281,925

(22) PCT Filed: Oct. 4, 2019

(86) PCT No.: PCT/EP2019/076933
§ 371 (c)(1),
(2) Date: Mar. 31, 2021

(87) PCT Pub. No.: WO2020/070293
PCT Pub. Date: Apr. 9, 2020

(65) Prior Publication Data
US 2021/0381858 A1 Dec. 9, 2021

(30) Foreign Application Priority Data
Oct. 4, 2018 (EP) .................................... 18198748

(51) Int. Cl.
*G01D 5/353* (2006.01)

(52) U.S. Cl.
CPC ..... *G01D 5/35316* (2013.01); *G01D 5/35335* (2013.01); *G01D 5/35341* (2013.01); *G01D 5/35387* (2013.01); *G01D 5/35396* (2013.01)

(58) Field of Classification Search
CPC ........... G01D 5/35316; G01D 5/35335; G01D 5/35341; G01D 5/35387; G01D 5/35396
See application file for complete search history.

(56) References Cited

U.S. PATENT DOCUMENTS

| | | | | |
|---|---|---|---|---|
| 4,989,199 A | * | 1/1991 | Rzeszewski | ........ H04J 14/0232 370/479 |
| 6,489,606 B1 | * | 12/2002 | Kersey | .................... G01L 1/246 385/13 |

(Continued)

OTHER PUBLICATIONS

Singer, "A Theorem In Finite Projective Geometry and Some Applications to Number Theory," Transactions of the American Mathematical Society, vol. 43, May 31, 1938, pp. 377-385.

(Continued)

*Primary Examiner* — Jonathan M Hansen
(74) *Attorney, Agent, or Firm* — Workman Nydegger

(57) ABSTRACT

A system for interrogating sensors in a fiber optical sensor network includes groups of sensors. The sensors in one group operate at different wavelengths, and the sensors of other groups may have overlapping wavelengths. A light source generates a broadband light signal, input and output means for guides the broadband light to the fiber optical sensor network for illuminating the sensors and for coupling the light signal coming from the sensors of the fiber optical sensor network to the detection system, and a detection system detects the received light signal, during a detection integration time. The system is arranged for selecting predominantly the received light coming from the different sensors of a selected group of sensors using a code-division multiplexing technique and simultaneously detecting sen- (Continued)

sors of the selected group of sensors using a wavelength-division multiplexing technique.

20 Claims, 12 Drawing Sheets

(56) References Cited

U.S. PATENT DOCUMENTS

| | | | | |
|---|---|---|---|---|
| 6,892,031 B2* | 5/2005 | Lee | ................... | G01D 5/35383 398/87 |
| 2004/0208624 A1* | 10/2004 | Fathallah | .............. | H04J 14/005 375/E1.034 |

OTHER PUBLICATIONS

Chung et al., "Optical Orthogonal Codes: Design, Analysis and Applications" IEEE Transactions on Information Theory, vol. 35, No. 3, May 31, 1989, pp. 595-604.
Koo et al., "Dense Wavelength Division Multiplexing of Fibre Bragg Grating Sensors using CDMA," Electronics Letters, vol. 35, No. 2, Jan. 21, 1999, 2 pages.
Abbenseth et al., "Distinct Enlargement of Network Size or Measurement Speed for Serial FBG Sensor Networks Utilizing SIK-DS-CDMA," Journal of Physics: Conference Series, vol. 15, Sep. 31, 2005, pp. 149-154.
Bonani et al., "Analysis of Unbalanced WDM/OCDM Transparent Optical Networks with Physical Constraints," 2010 12th International Conference on Transparent Optical Networks, Jun. 27-Jul. 1, 2010, pp. 1-4.
Noura et al., "Simultaneous Vibration and Humidity Measurement using a Hybrid WDM/OCDMA Sensor Network," 2013 IEEE 4th International Conference on Photonics (ICP), Oct. 28-30, 2013, pp. 163-165.
Lou et al., "Optical Chaos and Hybrid WDM/TDM Based Large Capacity Quasi-Distributed Sensing Network with Real-Time Fiber Fault Monitoring," 2015 Optical Fiber Communications Conference and Exhibition, Optics Express, vol. 23, Issue 3, Mar. 22, 2015, pp. 2416-2423.
International Search Report and Written Opinion from PCT Application No. PCT/EP2019/076933, dated Jan. 23, 2020.
Extended Search Report from corresponding EP Application No. 18198748.8, dated Apr. 2, 2019.

* cited by examiner

One chip consisting
of 5 sub-chips

Modulator 1: 11111 00000 11111 11111 11111 00000 ....

Modulator 2: 00100 00000 00100 00100 00100 00000 ....

Inverse code: 00000 00100 00000 00000 00000 00100 ....

INTERROGATION OF OPTICAL FIBER SENSOR NETWORKS

FIELD OF THE INVENTION

The present invention relates to the field of optics. More particularly, the present invention relates to systems and methods for interrogating optical fiber sensor networks in a fast and accurate way using multiplexing techniques.

BACKGROUND OF THE INVENTION

In present days, networks of optical sensors gain a lot of attention. In terms of "smart structures", where high numbers of sensors are required to monitor the condition of a material or system, optical fiber sensor networks are an essential part of the system. By means of these networks that are small and light, and independent of electro-magnetic interference, it is possible to implement sensors measuring strain, temperature or other parameters into a setup. To achieve a high spatial measurement resolution, the density of sensors needs to be as high as possible, preferably in a single optical fiber. In the following example, optical sensors are referred to as Fiber Bragg Gratings (FBGs). Addressing each individual FBG requires special multiplexing techniques.

State of the art considering interrogation of optical fiber sensor networks are time-division multiplexing (TDM), wavelength-division multiplexing (WDM), optical frequency domain reflectometry (OFDR) or code-division multiplexing (CDM). Many of them are methods used in communication standards.

Time-division multiplexing (TDM) makes use of the propagation speed of light in a fiber. Each FBG is located at a different location in an optical network wherein each location results in a different time delay due to different propagation lengths. A light source emits short pulses that travel through the network and a part of the wavelength spectrum of these pulses are subsequently reflected by each sensor. Thus, the density of sensors is limited to the pulse length as not more than one sensor can be radiated on the same time. The pulse length itself is limited to the required power of light to obtain a sufficient signal to noise ratio (SNR). The shorter the pulse, the lower the transmitted optical power. At the interrogator, a series of pulses arrives where each pulse contains the wavelength information of a single FBG. Hence, all FBGs in a network have a distinct time slot. Since the interrogator has to wait for a full pulse round trip time before launching a new pulse the major disadvantages of TDM are the measurement time and the low energy received by the interrogating equipment.

Wavelength-division multiplexing (WDM) is currently the standard for monitoring FBG arrays. Each sensor has a distinct spectral slot wherein it can operate. As FBGs change their reflected wavelength when strain or temperature is applied, the wavelength slot needs to suit their operating wavelength region because overlapping spectra are not allowed. This limits the number of sensors in an array drastically and depends on the spectral width of the light source and the interrogator, e.g. a spectrometer. However, the spatial distance between the FBGs is not limited by the interrogator, it only depends on the fabrication technology of the FBGs. For instance, Draw Tower Gratings (DTG®s) may provide a very high sensor density, whereby the spatial distance between FBGs can be as small as 1 cm or even lower.

Optical frequency domain reflectometry (OFDR) is a method to interrogate numerous sensors in an optical fiber. It is based on the interferometry of light waves. This requires an additional reference reflector. The location of an optical fiber sensor is determined by a different optical path length compared to the reference. This method has a good spatial resolution but is limited to short fiber lengths of around 10 to 70 m.

Code-division multiplexing (CDM) is based on orthogonal codes modulated on incident light (resulting into a sequence of pulses, called chips) and at the receiving site. Similar as with TDM, each FBG has a different length of optical path and therefore its reflected light reaches the interrogator on different time slots. Each FBG can have the same operating wavelength. The reflected light is modulated using a second modulator and a spectrometer collects the throughput of optical power. Mathematically, an autocorrelation of the code is performed when using the same code on both modulators but with a differential time delay. Orthogonal codes have an autocorrelation that contains a peak for no time shift and zeros for all others. The time shift is adjusted at the second modulator so that the time shift corresponds to the reflected light of a distinct FBG. All other reflections are cancelled out by the correlation of an orthogonal code. The advantage over TDM, where only one pulse per roundtrip is received, is that much more optical power is collected which can be adjusted by the length of the code. This leads to a better SNR that is required for proper measurements. Nevertheless, a synchronization on each individual FBG is required like with TDM. Moreover, as in TDM, the minimum distance between the individual FBGs is linked to the pulse width.

Consequently, there is still room for improvement for obtaining fast and efficient multiplexing techniques for reading out optical fiber sensor networks.

SUMMARY OF THE INVENTION

It is an object of the present invention to provide fast and accurate techniques for reading out optical fiber sensor networks.

It is an advantage of embodiments of the present invention that interrogating of an optical fiber sensor network can be performed in a fast way, since several sensors can be read-out simultaneously. This fast interrogation can be performed without the need for high speed modulators, which would be needed when measurements need to be done one after the other sensor in a closely spaced configuration.

It is an advantage of embodiments of the present invention that interrogation of an optical fiber sensor network can be performed in a quantitative and accurate way, with a good signal to noise ratio.

The object is obtained by a system and/or method according to the present invention.

The present invention relates to a system for interrogating a selected set of adjacent sensors comprising at least two sensors, in a fiber optical sensor network, the system comprising
a light source for generating a broadband light signal, the broadband light signal spanning a wavelength range, so that the broadband light signal is suitable for activating a response of the sensors to be measured within the fiber optical sensor network,
a first modulator for modulating the light signal using a first modulation according to a predetermined code comprising a plurality of identifiable chips having a well-defined chip duration and with the chips having a low-state or a high-state, such that in a high-state more light is transmitted than in a low-state,
an input and output means for guiding the modulated broadband light to the fiber optical sensor network for illuminating the different sensors in the selected set of sensors and for coupling the light signal coming from the different sensors of the fiber optical sensor network, to the second modulator and detection system.

A low state may be generated by a first modulator blocking at least part of the light signal or, when the modulator is based on amplification, by an amplifier not or substantially less (compared to a high-state) amplifying the light signal. A high-state may be generated by a first modulator allowing the light to pass substantially more than in a low-state, or by an amplifier amplifying or substantially more (compared to a low-state) amplifying the light signal.

The system also comprises a second modulator for modulating the received light signal with a second modulation according to a second predetermined code with the same chip duration as used for the first modulator, the second predetermined code being interdependent on the first predetermined code, wherein the ON-time of the high-state chip of the first modulation and the ON-time of the corresponding high-state chip of the second modulation are such that pre-dominantly the received light of the selected set of sensors will pass the second modulator, and
a detection system for detecting the modulated received light signal, during a detection integration time, for simultaneously detecting the sensors of said selected set of sensors and for deriving based thereon a measurement of the sensor response of the selected set of sensors using a wavelength-division multiplexing technique. The code advantageously may be a unipolar code that has good correlation behavior.

The code may be orthogonal.

In some embodiments, the selected set of sensors may be a full WDM section. The method may comprise interrogating different selected sets of sensors. These different selected sets of sensors may be multiplexed based on wavelength-division multiplexing. Between the selected sets, code-division multiplexing is applied. The system has the advantage of allowing simultaneous illumination of all sensors, while allowing to properly distinguish sensor responses from the different sensors. The system allows fast sensing and simultaneous sensing from a plurality of sensors. It furthermore allows multiplexing based on simple electronics components. It is an advantage of embodiments of the present invention that by selecting the ON-time of a high-state chip in the first modulation and the second modulation appropriately, overlap between different sets of sensors can be avoided, without the need for additional counter measures.

The second predetermined code may be time-shifted with respect to the first modulation, wherein the time delay, the ON-time of the high-state chip of the first modulation and the ON-time of the corresponding high-state chip of the second modulation are such that pre-dominantly the received light of the selected set of sensors will pass the second modulator.

The second predetermined code may be substantially the same as the first predetermined code, having the same chip duration and the same sequence of chips as in the first modulation.

The selected set of sensors may comprise a plurality of sensors which have different, at least partly non-overlapping wavelength responses.

The selected set of sensors may have at least partly similar wavelength responses as other sensors in the fiber optical sensor network.

The sum of the duration of the ON-time within a high-state chip for the first modulator and the ON-time within a corresponding high-state chip for the second modulator may be larger than the time delay between the detection of the sensor response of the first sensor and the detection of the sensor response of the last sensor of the selected set of sensors.

The duration of the ON-time within a high-state chip for the first modulator and the ON-time within a corresponding high-state chip for the second modulator may be smaller than the time delay between the detection of the sensor response of the last sensor of the sensors preceding the selected set of sensors and the detection of the sensor response of the first sensor of the sensors following the selected set of sensors.

The system may be furthermore adapted for adapting the second modulator for modulating, in a second detection integration time, the received light signal using said second predetermined code, but time-shifted with a second time-delay depending on a travel time of the light signal to and from the plurality of sensors of a second selected set of sensors, so as to select in said second modulator contributions in the received light signal of said second selected set of sensors and so as to detect in the detection system responses of said plurality of sensors of said second selected set of sensors for deriving a sensor response for each of the plurality of sensors of the second selected set of sensors. It is to be noted that whereas the principle has been described with respect to a second set of sensors, this can be further expanded with further sets of sensors.

It is an advantage of embodiments of the present invention that sensors having a same wavelength response in different sets of sensors, although being irradiated at the same time using the broadband source, can be distinguished based on code-division multiplexing. The latter allows for accurate identification of sensor responses.

A plurality of codes may be applied subsequently during a same integration time and the system may be adapted for varying the time-delay during the detection integration time over a time span depending on the detection time of the response of the first detected sensor of the selected set of sensors and the detection time of the response of the last detected sensor of the selected set of sensors.

It is an advantage of embodiments of the present invention that contributions of sensors that are positioned at edges in the set of sensors and sensors that are positioned more centrally in the set of sensors can be detected with similar signal to noise ratios.

A part or all of the received light signal may be modulated with a third modulation according to a third code corresponding with the second predetermined code, but wherein the state of the code chips has been inversed to the other state, the third code being time-shifted with the same time-delay as the second modulation if any. The processing system may be configured for measuring the difference between the detected wavelength spectra measured using the second pre-determined code and the inverse code, and for deriving based thereon a sensor response for each of the plurality of sensors of said first selected set of sensors by wavelength dependent analysis of the detected correlated received light signal.

It is an advantage of embodiments of the present invention that detection of the selected set of sensors can be performed while minimizing the signal contribution of the other sensors in the fiber optical sensor network.

The broadband light source may be any of a broadband superluminescent light emitting diode or an amplified spontaneous emission light source or a Semiconductor Optical Amplifier (SOA).

The first modulator may be an inherent part of the broadband light source, the broadband light source thus being adapted for directly outputting the modulated light signal. The modulation may also be done by controlling the driving electronics of the light source.

The optical input and output means may comprise a fiber coupler or a circulator.

The sensors may be Fiber Bragg Gratings.

The detection system may comprise a photo-diode based spectrometer.

The system may furthermore have several sets of modulators and detection systems working in parallel whereby each set is operated using a different time-delay such that different selected sets of sensors are read-out simultaneously.

The system may be measuring the fiber optical sensing network in reflection.

The system may be measuring the fiber optical sensing network consisting of different WDM sections in transmission, wherein each of the WDM sections are put in parallel using an optical coupler and whereby the transmitted signals are coupled again together into one fiber by using for example a second optical coupler in a way that time delays are introduced between the detection of the different WDM sections. Such time delays can for example be realized using delay lines (for example a fiber loop).

The present invention also relates to an optical system comprising a fiber optical sensor network and a system for interrogating a fiber optical sensor network as described above.

In one aspect, the present invention also relates to a system for interrogating sensors in a fiber optical sensor network, the fiber optical sensor network comprising several groups of sensors, wherein the sensors in one group are operating at different wavelengths and the sensors of different groups may have overlapping wavelengths. The system comprises a light source for generating a broadband light signal, the broadband light signal spanning a wavelength range, so that the broadband light signal is suitable for activating a response of the sensors to be measured within the fiber optical sensor network. The system also comprises an input and output means for guiding the broadband light to the fiber optical sensor network for illuminating the sensors and for coupling the light signal coming from the sensors of the fiber optical sensor network to the detection system. It further comprises a detection system for detecting the received light signal, during a detection integration time, the system being arranged for selecting pre-dominantly the received light coming from the different sensors of a selected group of sensors using a code-division multiplexing technique. The system also is being arranged for simultaneously detecting sensors of the selected group of sensors using a wavelength-division multiplexing technique and for deriving based thereon a measurement of the sensor response of sensors of the selected group of sensors.

The sensors may be Fiber Bragg Gratings. The system may comprise a first modulator for modulating the light intensity coming from the light source using a first modulation according to a predetermined code comprising a plurality of identifiable chips having a well-defined chip duration and with the chips defining a low-state or a high-state, such that in a high-state more light is transmitted than in a low-state, and the system may comprise a second modulator for modulating the light signal coming from the sensors of the fiber optical sensor network after passing the output means with a second modulation according to a second predetermined code with the same chip duration as used for the first modulator, the second predetermined code being interdependent on the first predetermined code, wherein the ON-time of the high-state chip of the first modulation and the ON-time of the corresponding high-state chip of the second modulation are such that pre-dominantly the received light of the selected group of sensors will pass the second modulator.

Using a code division multiplexing technique may comprise using a different correlation response for a specific time delay setting between signals in the code division multiplexing technique.

The system may be arranged for deriving a measurement of the sensor response of sensors of other selected groups using a code-division multiplexing technique.

Further features may correspond with features as described in the other aspects.

The present invention furthermore relates to a method for interrogating a selected set of sensors comprising at least two sensors, in a fiber optical sensor network, the method comprising generating a broadband light signal, the broadband light signal spanning a wavelength range, so that the broadband light signal is suitable for activating a response of the sensors to be measured in the fiber optical sensor network, modulating the light signal using a first modulation according to a predetermined code comprising a plurality of identifiable chips having a well-defined chip duration, wherein the chips have a low-state or a high-state such that in a high-state more light is transmitted than in a low-state, guiding the modulated broadband light to the fiber optical sensor network for illuminating the different sensors in the fiber optical sensor network and for coupling the light signal coming from the different sensors of the fiber optical sensor network, to the second modulator and detection system, modulating the received light signal with a second modulation according to a second predetermined code with the same chip duration as used for the first modulator, the second predetermined code being interdependent on the first predetermined code, wherein the ON-time of the high-state chip of the first modulation and the ON-time of the corresponding high-state chip of the second modulation are such that pre-dominantly the received light of the selected set of sensors will pass the second modulator, detecting the modulated received light signal, during a detection integration time, for simultaneously detecting the interaction of said signal with the sensors of said selected set of sensors and deriving based thereon a measurement of the sensor response of the sensors of the selected set of sensors using a wavelength-division multiplexing technique.

The second predetermined code may be time-shifted with respect to the first modulation, wherein the time delay, the ON-time of the high-state chip of the first modulation and the ON-time of the corresponding high-state chip of the second modulation are such that pre-dominantly the received light of the selected set of sensors will pass the second modulator.

The second predetermined code may be substantially the same as the first predetermined code, having the same chip duration and the same sequence of chips as in the first modulation.

In one aspect, the present invention also relates to a method for interrogating sensors in a fiber optical sensor network, the fiber optical sensor network comprising several groups of sensors, wherein the sensors in one group are operating at different wavelengths and the sensors of different groups may have overlapping wavelengths. The method comprises generating a broadband light signal, the broadband light signal spanning a wavelength range, so that the broadband light signal is suitable for activating a response of the sensors to be measured in the fiber optical sensor network, guiding the broadband light to the fiber optical sensor network for illuminating the different sensors in the fiber optical sensor network and for coupling the light signal coming from the different sensors of the fiber optical sensor network, to the detection system,—pre-dominantly selecting the received light coming from the different sensors of a selected group of sensors using code-division multiplexing technique, simultaneously detecting sensors of the selected group of sensors using a wavelength-division multiplexing technique, and deriving based thereon a measurement of the sensor response of the sensors of the selected group of sensors.

The method may comprise modulating the light signal using a first modulation according to a predetermined code comprising a plurality of identifiable chips having a well defined chip duration, wherein the chips have a low state or a high state, such that in a high state more light is transmitted than in a low state, and modulating the light signal received from said fiber optical sensor system with a second modulation according to a second predetermined code with the same chip duration as used for the first modulator, the second predetermined code being interdependent on the first predetermined code, wherein the ON time of the high state chip of the first modulation and the ON time of the corresponding high state chip of the second modulation are such that pre-dominantly the received light of the selected group of sensors will pass the second modulation.

The second predetermined code may be time-shifted with respect to the first modulation, wherein the time delay, the ON-time of the high-state chip of the first modulation and the ON-time of the corresponding high-state chip of the second modulation are such that pre-dominantly the received light of the selected group of sensors will pass the second modulator.

Other method steps may correspond with method steps as described in the other aspects.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
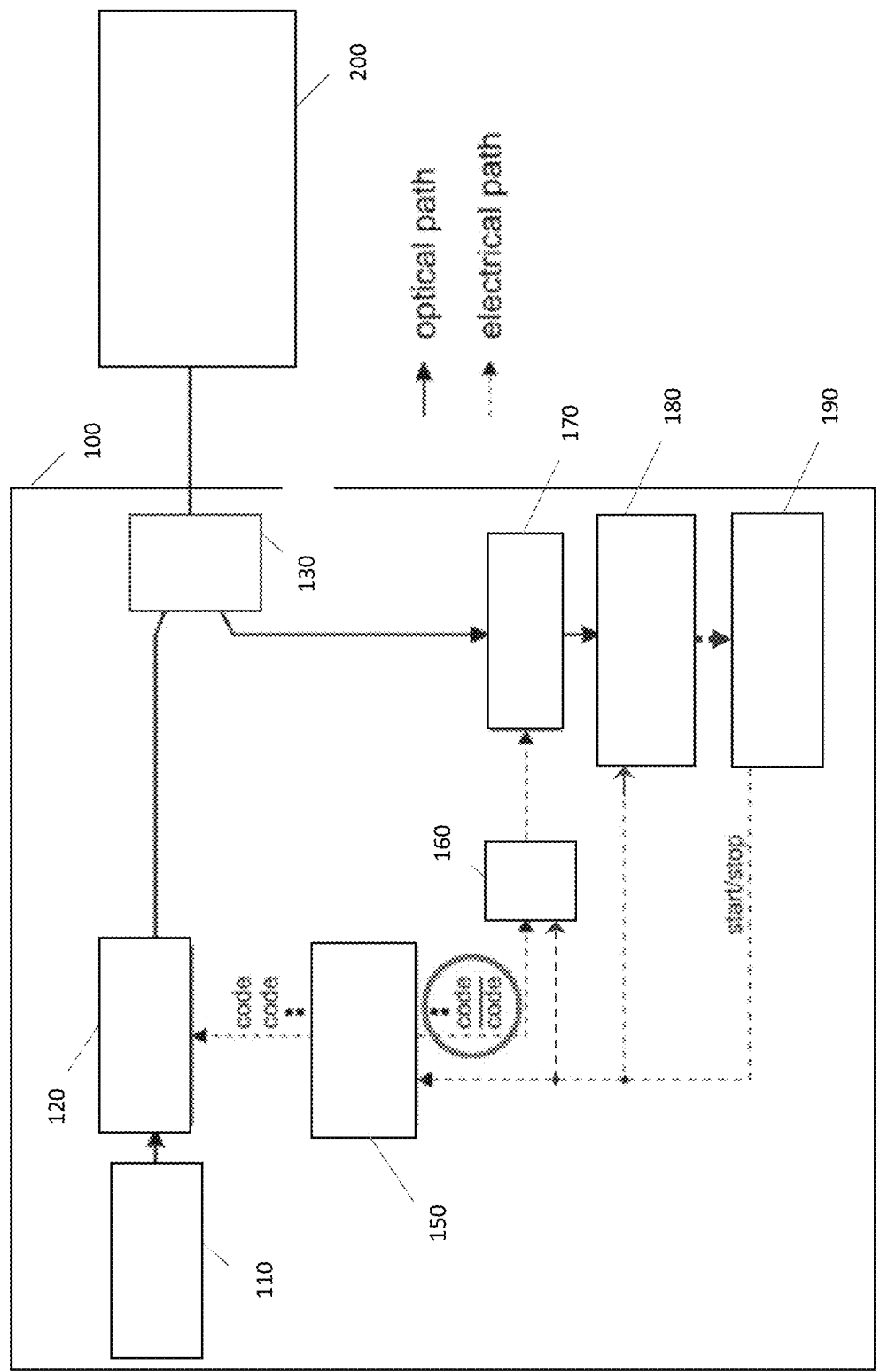
FIG. 1 illustrates a schematic representation of an interrogation system according to embodiments of the present invention.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to code-division multiplexing or to a code-division multiplexing technique, reference is made to a technique wherein multiple responses of the sensors are collected simultaneously and subsequently correlated with a code to preferentially increase or maximize the receiver signal of a selected group of sensors and to reduce or minimize the receiver signal of all other sensors.

Where in embodiments of the present invention reference is made to a group of sensors, reference is made to a plurality of sensors. Alternatively, for referring to a plurality of sensors, reference also can be made to a set of sensors.

Where in embodiments of the present invention reference is made to a high-state and a low-state for modulating the radiation, reference is made to a state wherein more radiation is transmitted (the higher intensity corresponding with the high-state) relative to less radiation is transmitted (the lower intensity corresponding with the low-state). A low-state therefore does not refer to the fact that all of the radiation is blocked, not that at least 50% of the radiation is blocked, but rather to the situation where less radiation is transmitted than in a high-state. This can for example also be realized using a Semiconductor Optical Amplifier (SOA) whereby the light signal in a low-state is not amplified and the light signal in a high-state is amplified, or whereby the light signal in a low-state is less amplified than in a high-state.

Where in embodiments of the present invention reference is made to a same chip duration, this also encompasses the situation where one code has chips with half the chip duration as another code, but wherein in this code two chips with the same state are repeated, so that the code factually results in the same code as if the code would have had the same chip duration.

Where in embodiments of the present invention reference is made to "pre-dominantly the received light of the selected set of sensors will pass the second modulator", reference is made to the fact that the contribution of the received light of the selected set of sensors will be more significant than the received light of another set of sensors, so that the selected set of sensors can be evaluated. In some embodiments, the contribution of the received light of the selected set of sensors will be the predominant contribution in the overall received signal.

Where in embodiments of the present invention reference is made to a broadband light source, reference is made to a light source spanning at least a wavelength range covering the operating wavelength ranges of the optical sensors to be measured. Any type of wavelength ranges can be used but some typical used wavelength ranges of the light source are between 820 and 860 nm or between 1525 and 1565 nm or between 1510 and 1590 nm.

Where in embodiments of the present invention reference is made to adjacent sensors, reference is made to sensors adjacent in the time domain, i.e. for which the response is time adjacent in the detection. This also comprises the situation where the response in the detection is simultaneous.

In this detailed description, some embodiment of the present invention will typically be illustrated by referring to first and second modulation using the same predetermined code, whereby the ON-time in chips of the codes in the first and second modulation can be different. The smallest entity of a code is then considered to be the chip, whereby the ON-time of the chip thus can be different for the first and second (and optionally third) modulation. This nevertheless could also be described as modulation according to different codes, whereby the smallest entity of the code is not a chip, but part of a chip, e.g. referred to as sub-chip, whereby a number of sub-chips constitutes a chip, and wherein the states of the sub-chips determine the ON time. Using such a formalism, typically the sequence of chip states will be the same, but the sequence of sub-chips may typically vary to take into account different ON times during the first and second (and optionally third) modulation. It will be clear that this is only a different way of expression but still covers the underlying idea.

In a first aspect, the present invention relates to a system for interrogating a selected set of sensors at least two sensors in a fiber optical sensor network. The selected set of sensors may comprise sensors which have different, at least partly non-overlapping wavelength responses, such as for example different, at least partly non-overlapping wavelength reflections, which can be characterized using wavelength-division multiplexing technology. Sensors from different selected sets of sensors can have the same wavelength response (e.g. wavelength reflections). The sensors in the optical fiber sensor network may be any type of sensor that responses to a particular wavelength (e.g. reflects or transmits a particular wavelength) and whereby this wavelength response changes upon a specific environmental interaction, such as an induced strain, an interaction with a specific substance presence in the environment, etc. Examples of sensors may be Fiber Bragg Gratings (FBG), Fabry-Perot-Interferometers, Dielectric thin film sensors, etc. Advantageously, the number of sensors can be high, allowing a sensor network with a large density of sensors. The number of sensors may for example be 2000. The network may, depending on the application envisaged, have a suitable configuration, such as for example be a serial network or a star shaped network or a combination of both. The length of the network, i.e. of the optical fiber with sensors, can be evaluated and can be easily varied. The longest length typically may be determined by the attenuation of the optical fiber and the resulting optical loss that can be allowed for obtaining sufficiently accurate sensor measurements.

Figures 18, 19:
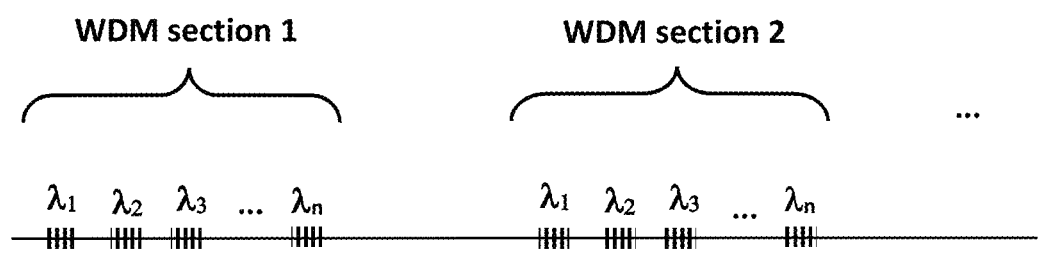
FIG. 18 illustrates the implementation of a code and inverse code as can be used in embodiments according to the present invention.
FIG. 19 illustrates an optical fiber sensor network, as can be interrogated using an embodiment of the present invention.

An example of a fiber optical sensor network illustrating two sets of pluralities of sensors, in the present example being two WDM sections, is shown in FIG. 19.

The system comprises a light source for generating a broadband light signal, the broadband light signal spanning a wavelength range covering the operating wavelength ranges of the sensors to be measured in the fiber optical sensor network, so that the broadband light signal is suitable for activating a response of the sensors within the selected set of sensors. The broadband light source may be any type of broadband light source, such as for example a broadband superluminescent light emitting diode (SLED) or an amplified spontaneous emission (ASE) light source or a Semiconductor Optical Amplifier (SOA).

Figure 17:
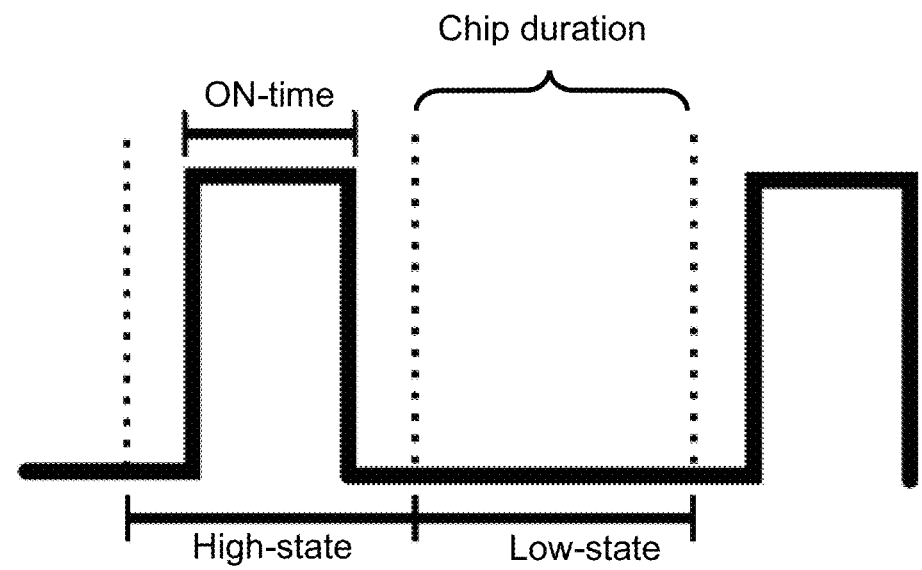
FIG. 17 illustrates the configuration of a high-state and a low-state chip.

The system also comprises a "first modulator" for modulating the light signal using a first modulation. The modulator is a device in which a signal-controlled element is used to modulate the intensity of a beam of light. The modulation can be for example an electro-optic modulator (EOM), a Semiconductor Optical Amplifier (SOA), an optical switch or any other optical device that can modulate the light intensity. The modulation is done according to a predetermined code comprising a plurality of identifiable sequence of pulses, called "chips" having a well-defined chip duration. The chips have a low-state corresponding with the first modulator blocking at least partly the light signal or with an amplifier not substantially amplifying the signal or have a high-state corresponding with the first modulator allowing at least part of the radiation to pass or with an amplifier substantially amplifying the signal, such that in a high-state more light is transmitted than in a low-state. Within a high-state chip, the time that the modulator allows at least partly the radiation to pass or the time that the amplifier substantially amplifies the signal, may be controlled and does not need to correspond with the full chip duration as shown in FIG. 17. The implementation of this so called "ON-time", which can also be referred to as the duty cycle of the high-state chip, can be implemented by dividing the chip in a number of sub-chips each sub-chip corresponding with a certain time duration, or can be implemented in a way that it can be controlled continuously. An example of the implementation of a predetermined code for the first modulator is by way of illustration shown in FIG. 18, wherein the code exists of plurality of chips whereby each chip exists of 5 sub-chips whereby a sub-chip value of 1 corresponds to a certain time duration during which light is passed. For the first modulator, the ON-time is equal to 5 sub-chips and therefore equals the chip duration in this example.

Modulation may be performed using an external modulator, the modulator being external to the light source, or the modulation may be directly implemented in the light source. Alternatively, the modulation may also be done by controlling the driving electronics of the light source. Directly modulated light sources may provide the advantage that less intensity losses occur compared to the use of separate modulators. According to embodiments of the present invention, the modulation allows implementing a code in the light intensity that is sent to the fiber optical sensor network. The system also comprises an "input and output means" to on the one hand guide the modulated broadband light to the fiber optical sensor network for illuminating via said input and output means, the different sensors of the fiber optical sensor network and on the other hand guide the light signals coming from the different sensors of the fiber optical sensor network, to the second modulator and detection system (e.g. spectrometer). In order to obtain such guiding, the "input and output means" may be for example an optical coupler or an optical circulator. Whereas the functions of the input and output means in most embodiments are performed by a single component, embodiments of the present invention are not restricted thereto, and the different functions can be performed using different components. For example, in case of a transmission measurement whereby the fiber optical sensor network is connected into a loop configuration to the system, the input and output means typically may exist of two separate connectors.

The system further comprises a second modulator for modulating the received light signal coming from the fiber optical sensor network, with a second modulation according to a second predetermined code with the same chip duration as used for the first modulator, the second predetermined code being interdependent on the first predetermined code. The ON-time of the high-state chip of the first modulation and the ON-time of the corresponding high-state chip of the second modulation are such that pre-dominantly the received light of the selected set of sensors will pass the second modulator. The chip duration typically will be at least the length of the longest ON-time of a chip.

In some embodiments, the second predetermined code has the same chip duration as used for the first predetermined code, the second predetermined code being interdependent on the first predetermined code and being time-shifted with respect to the first modulation, wherein the time delay, the ON-time of the high-state chip of the first modulation and the ON-time of the corresponding high-state chip of the second modulation are such that pre-dominantly the received light of the selected set of sensors will pass the second modulator. It is to be noted that the ON-time for the high-state can be different for the first and second modulator. For the sake of ease of explanation, in the further description and examples, embodiments of the present invention will be illustrated for first and second (and third) modulations making use of a predetermined code having the same sequence of chips. An example of the implementation of a predetermined code for the second modulator is by way of illustration shown in FIG. 18. The code of the second modulator in this drawing exists of plurality of chips whereby each chip exists also of 5 sub-chips (same chip duration as the chips used for the first modulator) but the ON-time within a chip corresponds to 1 sub-chip. The second code in FIG. 18 will also be time-shifted with respect to the first modulation with a delay depending on the travel time of the light signal to and from the sensors of a first selected set of sensors. Due to this time delay, only the signal coming from said selected set of sensors will be efficiently send to the detection system, compared to light signals stemming from other sensors in the fiber optic sensor network. As a consequence, the time delay allows to read-out the selected set of sensors. For selecting a different selected set of sensors to be read-out, the time delay is typically reset to a new value depending on the time travelled by the light signal to and from that different selected set of sensors. The sum of the duration of the ON-time within a high-state chip for the first modulator, and the ON-time within a high-state chip for the second modulator is larger than the time delay between the detection of the sensor response of the first detected sensor and the detection of the sensor response of the last detected sensor, of the selected set of sensors. Within the example of the implementation of the predetermined codes shown in FIG. 18, the duration of the sum of the ON-time equals to 6 times the duration of a single sub-chip (ON-time of the high-state of the first modulator is 5 sub-chips and the ON-time of the high-state of the second modulator is 1 sub-chip, summing up to 6 sub-chips).

The system further comprises a detection system to analyze the wavelength spectrum after the second modulator by integrating the light signal in a wavelength-division multiplexing system. One example of such a detection system is a photo-diode based spectrometer. The detection system typically integrates the light signals generated by one or multiple codes, for a fixed time delay, which corresponds to a selected set of sensors. By doing so, a correlation between the two modulated signals is measured. The system can furthermore be adapted for deriving based thereon a sensor response for each of the sensors in the selected set of sensors.

Sensors within a selected set of sensors, become in this way multiplexed based on wavelength-division multiplexing. Sensors from different set of sensors become multiplexed using code-division multiplexing (CDM).

The codes used may be code pairs or can also be orthogonal or quasi-orthogonal codes of which some may be balanced codes or Pseudorandom Binary Sequences (PRBS), etc. The codes used may be determined during the measurement based on a code generator, but also may be determined upfront and stored in a code memory. This may be performed in a processor. By way of illustration, embodiments of the present invention not being limited thereto, information regarding codes and the code theory can for example be found in Chung et al. in "Optical orthogonal codes: design, analysis and applications" IEEE Transactions on Information Theory, vol. 35 (my 1989) no. 3, pp. 595-604, or in Singer in "A theorem In finite Protective Geometry And Some Applications To number Theory" Transactions of the American Mathematical Society 43 (May, 1938), pp. 377-385 or in Luke in "Korrelationssignale, Korrelationsfolgen und Korrelationsarrays in Nachrichten-und Informationstechnik, Meßtechnik und Optik. It is an advantage of embodiments of the present invention that a hybrid scheme of the interrogation of wavelength-division multiplexing segments consisting of, for example, a maximum number of FBGs is combined with code-division multiplexing interrogation offering the capability of overlapping spectra in order to obtain a large, fast and dense fiber optical sensor network measurement. Such a network can for example consist of groups of FBGs whereby the sensors in each group operate at different wavelengths (WDM). Several groups can be added to the network where each group has a different correlation response for a specific time delay setting in the (CDM).

In some particular embodiments, the broadband light source may be a direct modulated broadband light source that for example makes use of the driving electronics to modulate the intensity of the light source. This excludes the insertion loss and cost of the first modulator.

In some particular embodiments, the detection system might be a direct modulated detection system that for example makes use of the driving electronics of the detector array to modulate the detection efficiency of the detectors. This can for example be done by controlling the gain of the detectors. This excludes the insertion loss and cost of the second modulator.

In some embodiments, one or more selected sets of sensors, may further comprise sensors with overlapping wavelengths within the same selected set of sensors. The information of these sensors cannot be characterized individually but by analyzing the wavelength spectrum of the specific selected set of sensor qualitative information can still be obtained.

In some embodiments, the detection system integrates the light signals coming from one selected group of sensors, generated by multiple codes, but where each code having a slightly different time delay, corresponding to a slightly different position in the selected group of sensors. This will allow to optimize the correlation function for the different sensors in the selected group of sensors.

In some embodiments, the selected set of sensors is a subset of a WDM section, but whereby the complete WDM section is measured during one integration cycle, by varying the time delay for some individual codes during the integration cycle, corresponding to a full scan of the specific WDM section.

In some embodiments, the predetermined code, of the first and second modulator, are identical resulting into an autocorrelation.

In some embodiments, the predetermined code, of the first and second modulator, are different resulting into a cross-correlation.

In some embodiments, several selected sets of sensors may be read-out simultaneously by having several "second modulators" and "detection systems" working in parallel, each with a different time delay for the CDM detection, in order to increase the detection speed of the complete fiber optical sensor network.

In some embodiments, a selected set of sensors is measured using a predetermined code whereby the sum of the duration of the ON-time within a high-state chip for the first modulator, and the ON-time within a high-state chip for the second modulator is smaller than the time delay between the detection of the sensor response of the last sensor of the sensors preceding the selected set of sensors and the detection of the sensor response of the first sensor of the sensors following the selected set of sensors.

Whereas above the system has been described comprising particular modulators, more generally, the system may be arranged for selecting pre-dominantly the received light coming from the different sensors of a selected group of sensors using a code-division multiplexing technique and the system may be arranged for simultaneously detecting sensors of the selected group of sensors using a wavelength-division multiplexing technique and for deriving based thereon a measurement of the sensor response of sensors of the selected group of sensors.

By way of illustration, embodiments of the present invention not being limited thereto, a schematic overview of a particular embodiment is shown in FIG. 1. FIG. 1 illustrates an interrogation system 100 comprising a broadband light source 110, a first modulator 120 and an input and output means 130. A code generating means 150 as well as a delay determining means 160. Both these elements may be controlled using a processor 190. The system furthermore comprises a second modulator 170, which modulated the light coming from the fiber optical sensing network 200, and a wavelength-division multiplexing (WDM) measurement system 180. The processor 190 typically also is programmed for collecting and processing the measured spectral data. The system is adapted for being interconnected with a fiber optical sensor network 200.

Figure 9:
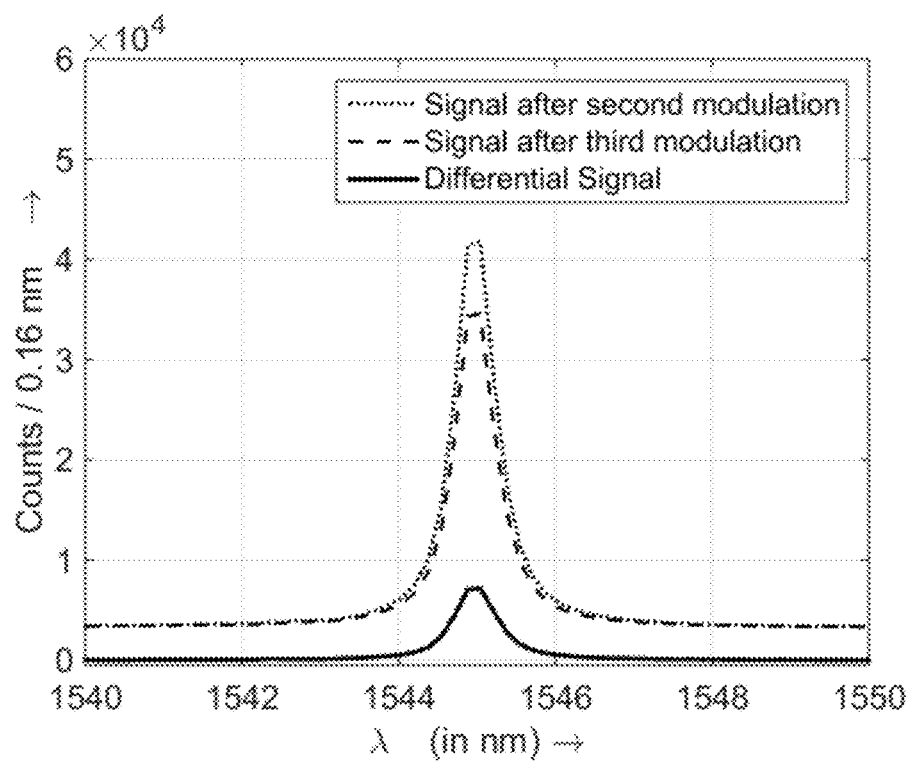

In some embodiments, sequence inverse keying (SIK) is performed. With this, a combination is made with a third modulation whereby the received light beam is modulated with the inverse code of the second modulation. The inverse code is constructed by replacing the chips with a low-state with a chip with a high-state and vice versa, while keeping the ON-time within the high-state chip identical. FIG. 18 depicts an example of such inverse code for the third modulation. The detected signal with the third modulation will become subtracted from the detected signal from the second modulation, resulting in an improved signal to noise ratio. FIG. 9 shows such example of the two recorded signals and the differential signal.

Figure 2:
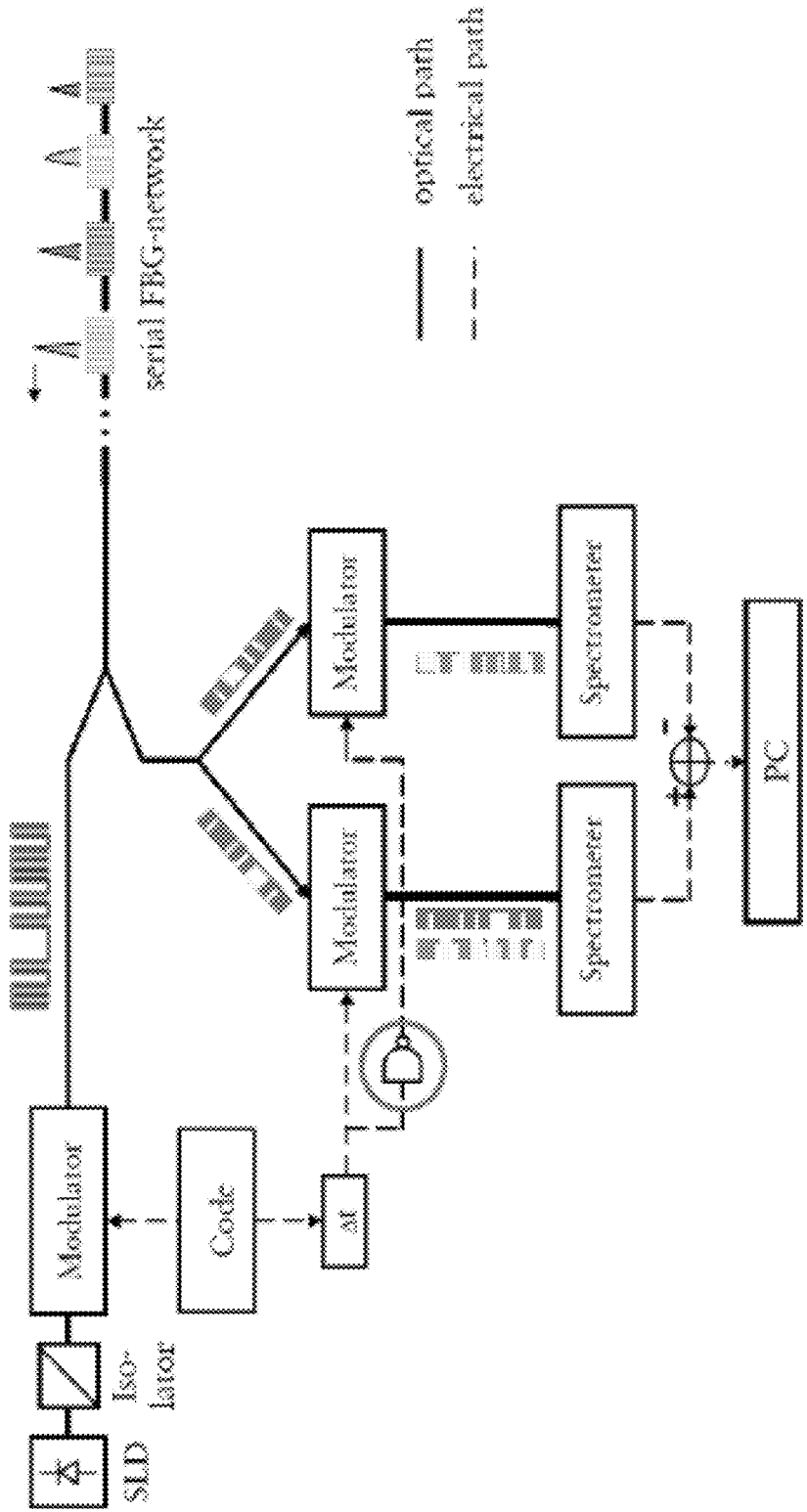
FIG. 2 to FIG. 3 illustrate a schematic representation of an interrogation system according to specific embodiments of the present invention.
Figure 3:
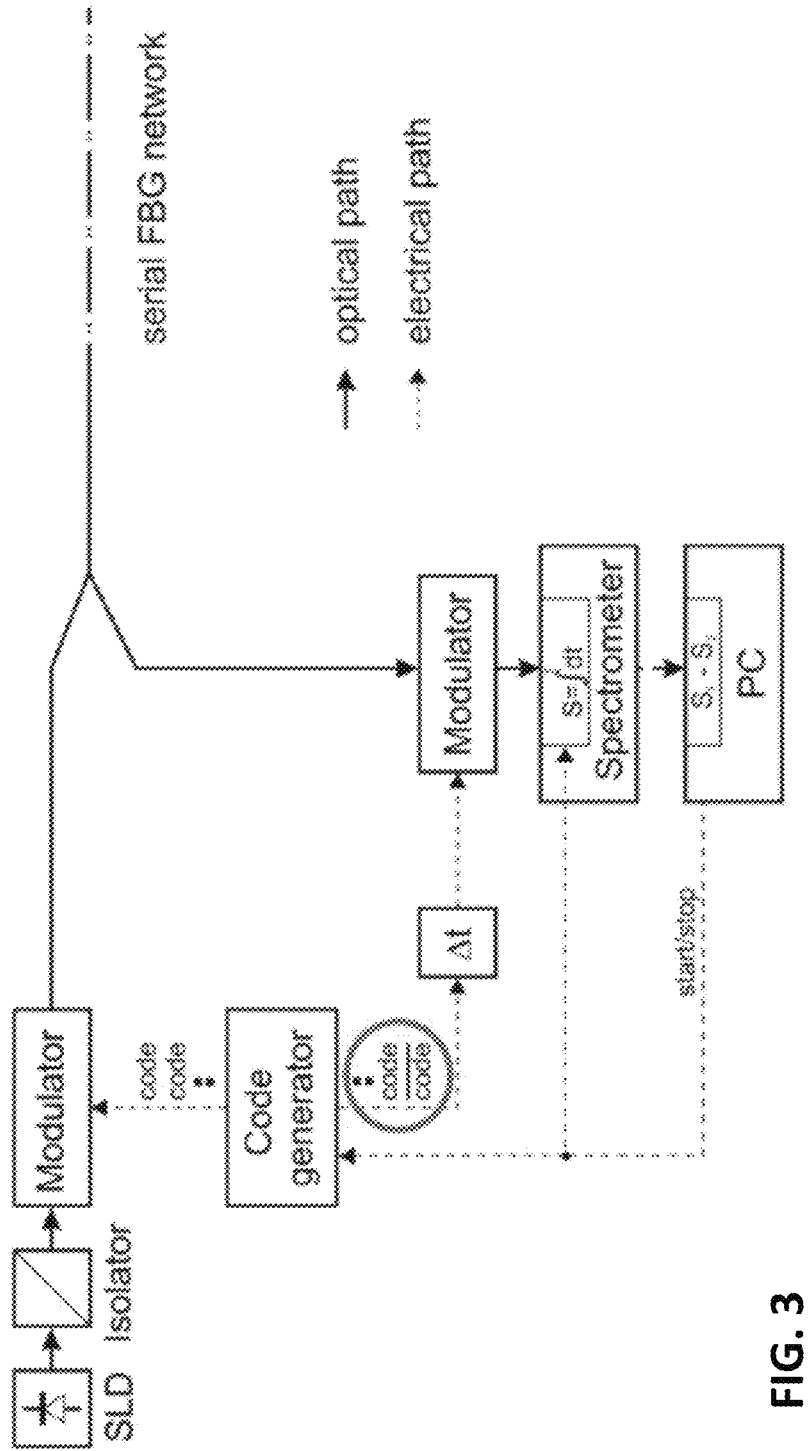

An exemplary embodiment is shown in FIG. 2, wherein the second modulation and third modulation are done simultaneously by making use of 2 modulators and 2 spectrometers. FIG. 3 illustrates a setup wherein the sequence inverse keying is performed using one spectrometer. In this case the code and inversed code are applied one after the other, of which for each of them the wavelength spectrum is measured, and the inverted spectrum is subtracted from the direct one to obtain a clear differential spectrum.

As the set of sensors typically will be spread over a certain length of the optical fiber, the selected time delay used for selecting that set of sensors typically will be exact only for one position along that set of sensors. This may lead to a difference in contributions of sensors being positioned close to that exact position or further away from that exact position. In order to compensate for this, the time delay may be varied during the integration time, such that the time delay is optimized for several positions along the length over the set of sensors as explained before. By such a variation, the contributions of the different sensors within one set of sensors will be more accurately taken into account. The time delay used may also be varied to equalize the signals. For example, sensors with low signal can be measured more often with their specific time delay.

A further solution for equalizing the contributions of the different sensors in a selected set of sensors, alternatively or in addition to other solutions, can be by changing the intensity of the sensor response (e.g. reflectance) depending on the position of the sensor in the set of sensors.

Figure 15:
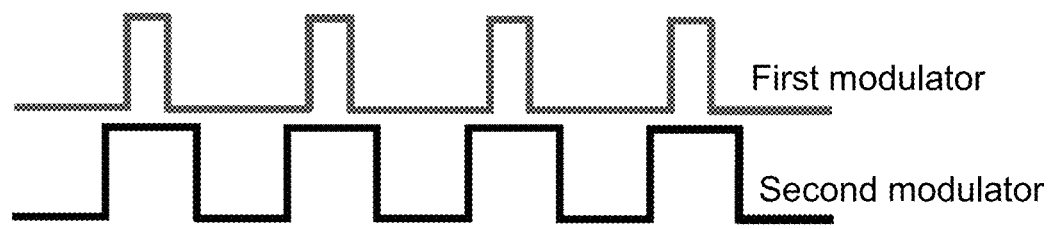
FIGS. 15 and 16 illustrate an improved chip configuration to optimize the correlation efficiency with respect to equalization of the intensities of the different sensors in one WDM section.
Figure 16:
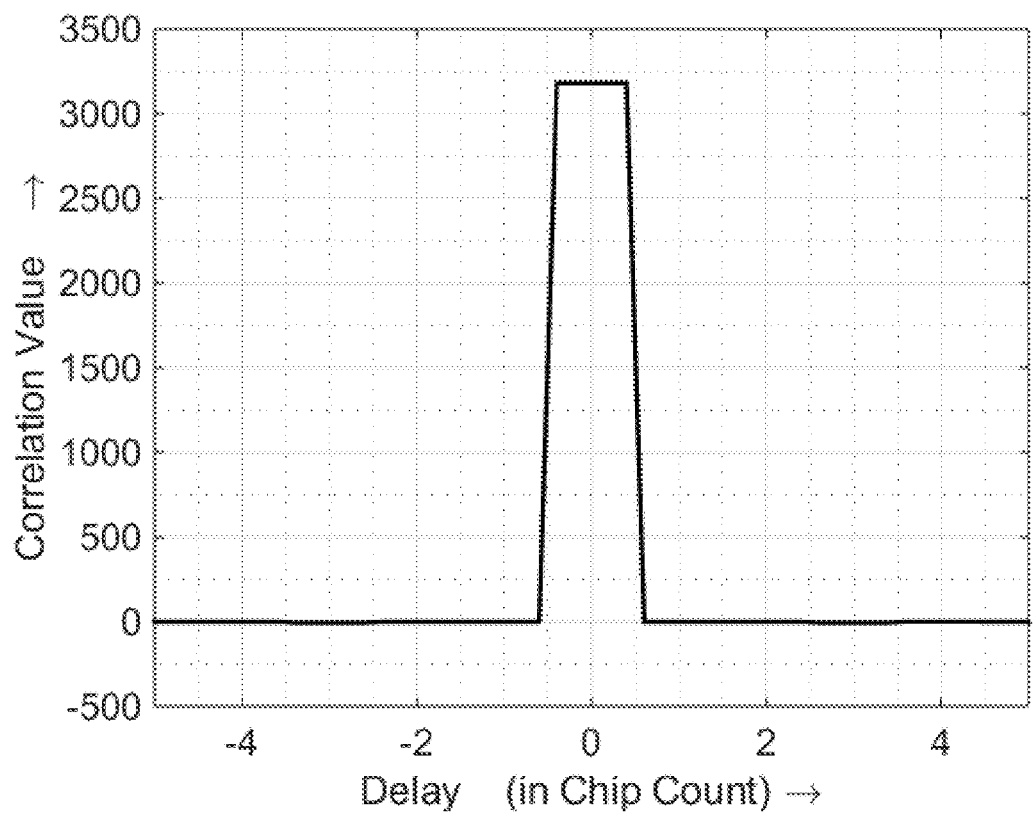

A further solution that can be applied to equalize the signals, alternatively or in addition to other solutions, is realized by adjusting the ON-time during the first and second modulation, decreasing the influence of the resulting triangular shaped correlation function that is a result of the correlation of 2 equal block pulses. For example, this can be realized by making the ON-time in the high-state chip of the first modulator, smaller than the ON-time in the high-state chip of the second modulator as shown in FIG. 15. The typical triangle shape of the correlation function will then become a Trapezium shape as shown in FIG. 16.

For densely spaced sensor arrays, the risk is increased that sensor contributions of other sets of sensors, e.g. other WDM sections, also start to be detected, depending for example on the chip length. Nevertheless, the optical fiber sensor network could be adapted so as to avoid such risk in case the selected set of sensors is smaller than the WDM section. The sensors in different WDM sections could for example be arranged such that for adjacent sensors from two different WDM sections, the wavelengths to which they are sensitive (e.g. wavelength reflection characteristic) are clearly distinct, such that based on wavelength, it can be distinguished from which set the contribution stems. This can for example be realized by having the sensors for all WDM sections arranged from low to high wavelength.

In one aspect, the present invention also may relate to a fiber optical sensor network comprising a plurality of sets of sensors, e.g. corresponding with the WDM sections as described above, whereby for each set of sensors an identifier is introduced in the optical fiber, allowing for identifying through optical measurement the set of sensors from which contributions will stem. Such an identifier may be implemented as a portion with a clearly different optical response, e.g. in case of FBG sensors, a different reflectance characteristic (e.g. wavelength, reflectivity, Full Width Half Maximum of the wavelength peak), or it may be providing a specific optical response corresponding with a series of well-defined FBG sensors. Such an identifier can in embodiments according to the present invention for example be used to identify a risk that during measurement of a certain set of sensors, a contribution will be present of sensors from another set of sensors. Typically, such identifiers may be positioned physically at the extremes of the set of sensors in the detection time domain that is to be identified.

In a further aspect, the present invention relates to an optical system comprising a system for interrogating a fiber optical sensor network according to the first aspect, as well as a fiber optical sensor network. One example of such an optical system, embodiments of the present invention not being limited thereto, is an optical shape sensing fiber and corresponding read-out interrogation system. In such applications, it is important to have a high density of sensors along the optical fiber and to have a read-out that is quick and accurate. Further optional features and advantages may correspond with those of the interrogation system as described in the first aspect or in the examples.

In yet another aspect, the present invention relates to a method for interrogating a selected set of sensors of at least 2 sensors in a fiber optical sensor network. Each set may comprise a plurality of sensors which have different, at least partly non-overlapping wavelengths responses (e.g. reflections). According to embodiments of the present invention, the method comprises generating a broadband light signal, the broadband light signal spanning a wavelength range, so that the broadband light signal is suitable for activating a response of the sensors within the selected set of sensors. It also comprises modulating the light signal using a first modulation according to a predetermined code comprising a plurality of identifiable chips having a well-defined chip duration, wherein the chips have a low-state corresponding with the first modulator blocking at least partly the light signal or an amplifiers substantially not or less amplifying the light signal or have a high-state corresponding with the first modulator passing at least partly the radiation or an amplifier substantially or substantially more amplifying the light signal, such that in a high-state more light is transmitted than in a low-state. The method further comprises guiding the modulated broadband light to the fiber optical sensor network for illuminating the different sensors in the fiber optical sensor network and for coupling the light signal coming from the different sensors of the fiber optical sensor network, to the second modulator and detection system. In a following step, the method comprises modulating the received light signal with a second modulation according to a second predetermined code with the same chip duration as used for the first modulator, the second predetermined code being interdependent on the first predetermined code, wherein the ON-time of the high-state chip of the first modulation and the ON-time of the corresponding high-state chip of the second modulation are such that pre-dominantly the received light of the selected set of sensors will pass the second modulator.

The method also comprises detecting the modulated received light signal, during a detection integration time, for simultaneously detecting the interaction of said signal with the sensors of said selected set of sensors. The method therefore deriving based thereon a measurement of the sensor response of the sensors of the selected set of sensors using a wavelength-division multiplexing technique. In some embodiments, the second predetermined code has the same chip duration as used for the first predetermined code, the second predetermined code being interdependent on the first predetermined code and being time-shifted with respect to the first modulation, wherein the time delay, the ON-time of the high-state chip of the first modulation and the ON-time of the corresponding high-state chip of the second modulation are such that pre-dominantly the received light of the selected set of sensors will pass the second modulator.

Figure 21:
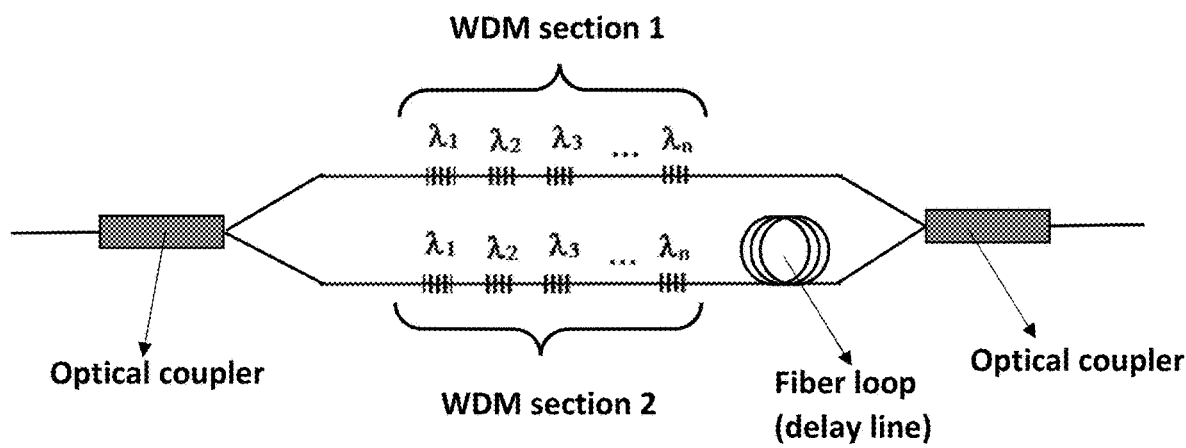
FIG. 21 illustrates an example of a transmission measurement configuration.

In yet another embodiment, the system may be measuring the fiber optical sensing network consisting of different WDM sections in transmission, wherein each of the WDM sections are put in parallel using an optical coupler and whereby the transmitted signals are coupled again together into one fiber by using for example a second optical coupler in a way that time delays are introduced between the detection of the different WDM sections. Such time delays can for example be realized using delay lines (for example a fiber loop). FIG. 21 shows an example of a measurement configuration whereby two WDM sections are measured in transmission.

Whereas the above method has been described implementing particular modulation steps, more generally, the method may be adapted for pre-dominantly selecting the received light coming from the different sensors of a selected group of sensors using code-division multiplexing technique, and for simultaneously detecting sensors of the selected group of sensors using a wavelength-division multiplexing technique. Further optional method steps may correspond with the functionality of certain components described for systems of the first or second aspect or shown in the examples.

By way of illustration, embodiments of the present invention not being limited thereto, standard and optional features of the multiplexing interrogation technique according to embodiments of the present invention are illustrated for an exemplary system and method as described below.

Figure 4:
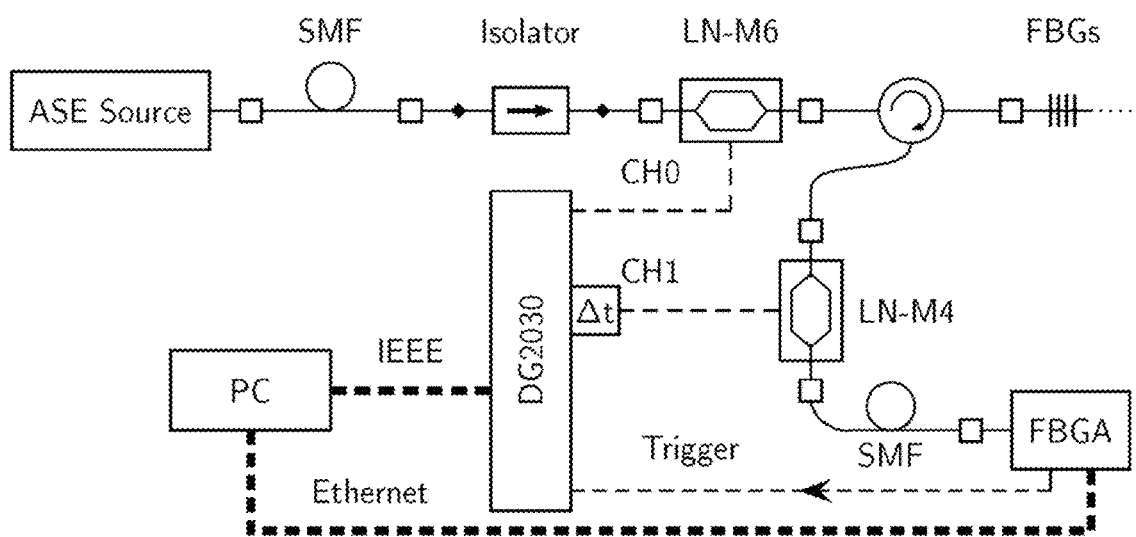
FIG. 4 illustrates a schematic representation of an interrogation system according to an embodiment of the present invention used for obtaining experimental results.

The example describes the multiplexing interrogation technique for two different networks: Network 1 has 5 identical WDM sections of 40 FBGs (200 FBGs) and Network 2 has 5 identical WDM sections of 80 FBGs (400 FBGs). Network 1 has a total fiber length of 16.95 m wherein the spacing between two FBGs in a WDM section is 5 cm and between two WDM sections 80 cm. 40 non-overlapping FBGs share a spectrum between 1511 nm and 1589 nm, so each 2 nm. Network 2 has a total length of 17.08 m wherein the spacing between two FBGs in a WDM section is 2.5 cm and between adjacent WDM groups 80 cm. 80 non-overlapping FBGs share a spectrum between 1510.5 nm and 1589.5 nm, thus each nanometer. All FBGs have a grating length of 5 mm. These networks are connected to an interrogator having a configuration as described in FIG. 4. A broadband light source, here an amplified spontaneous emission source with an isolator, is connected to a first modulator (LN-M6). Thus, the light is modulated with a code stored in the Data Generator (DG 2030). The modulated light passes a circulator that applies it to the sensor network. The reflected light passes the circulator again and reaches a second modulator (LN-M4) that modulates the reflected light a second time with the same code but shifted in time. The output of this modulator is connected to a spectrometer (FBGA) that collects all incident light during an adjustable integration time.

The measurement procedure starts with modulating the broadband light intensity with a code. The code is repeated several times within one integration time cycle of the spectrometer. The maximum number of repetitions that can be integrated during one measurement cycle, depends on the chip rate, the code length and the integration time itself. For the proof of concept, a code length of 31808 chips, an integration time of 23.857 ms and a chip rate of 80 MHz is used. This results in 60 repetitions of the code. The high-state of the chip has in all cases a duty cycle of 100%, meaning that the ON-time corresponds to the chip duration. To obtain a better correlation function, a unipolar-bipolar correlation by means of sequence inverse keying is applied. Hence, in the first sequence, the second modulator works with 60 times the identical code but shifted in time. The delay is adjusted so that it matches the propagation time of the reflected light of a distinct WDM section. This propagation time is in this example defined by the optical path length to the center of a WDM section. The spectrometer integrates the modulated light for 23.857 ms and saves that spectrum. In the second sequence, the second modulator works with 60 times the inverted code but also shifted in time. The delay needs to be the same as in the first sequence. After the spectrometer acquired this spectrum as well, it is subtracted from the first one. This differential spectrum represents now an optical unipolar-bipolar correlation of the code and matches only the WDM section that is assigned by the time delay of the second modulator.

Figure 5:
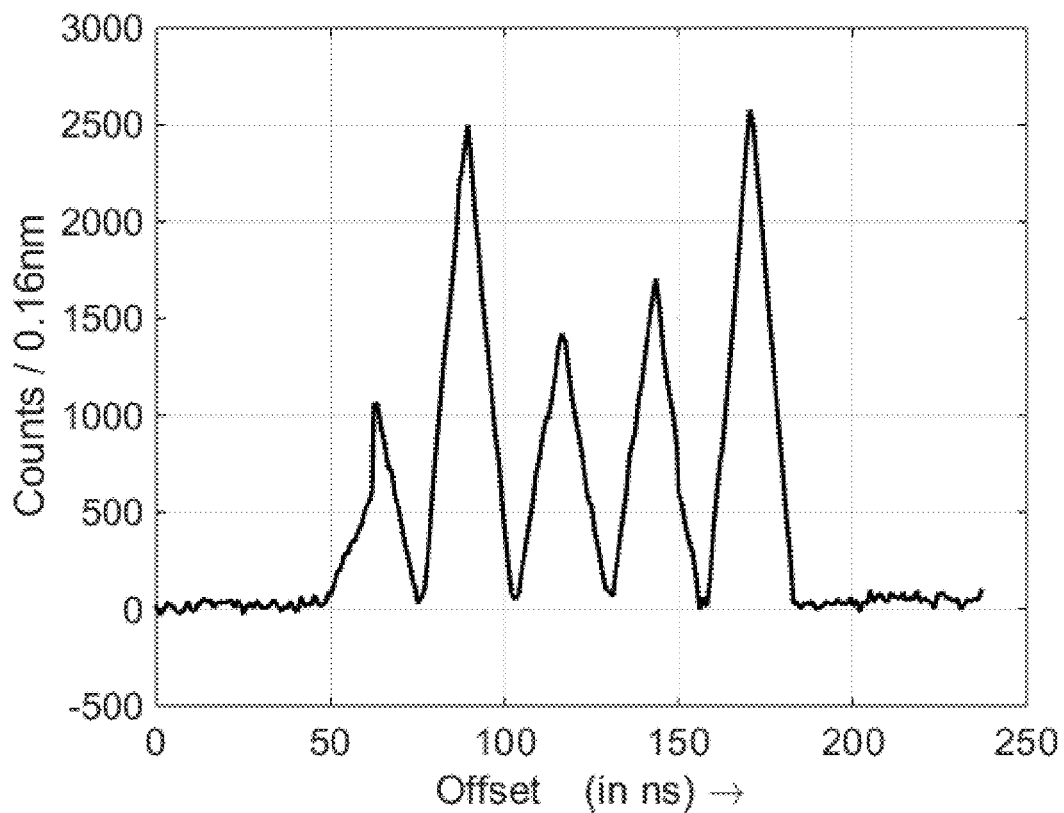
FIG. 5 to FIG. 9 illustrate optical results obtained in experimental results.

However, in the present example, the differential spectrum depicts an attenuation of the reflected power towards the edge of the WDM groups. This is a result of the correlation, as the time delay for the second modulator is only synchronized to the center of the WDM section. All other reflections have a slightly different time delay that increases towards the borders of the WDM section. The correlation function has a peak for no time shift and low values for all others. Due to the convolution of identical rectangles (chips with the same ON-time), the convolution result as function of the time delay showing a triangle shape. The size of the base of this triangle is two times the chip duration. FIG. 5 depicts that a chip rate of 80 MHz results in a chip duration of 12.5 ns, so 25 ns for the base of the triangle.

Figure 6:
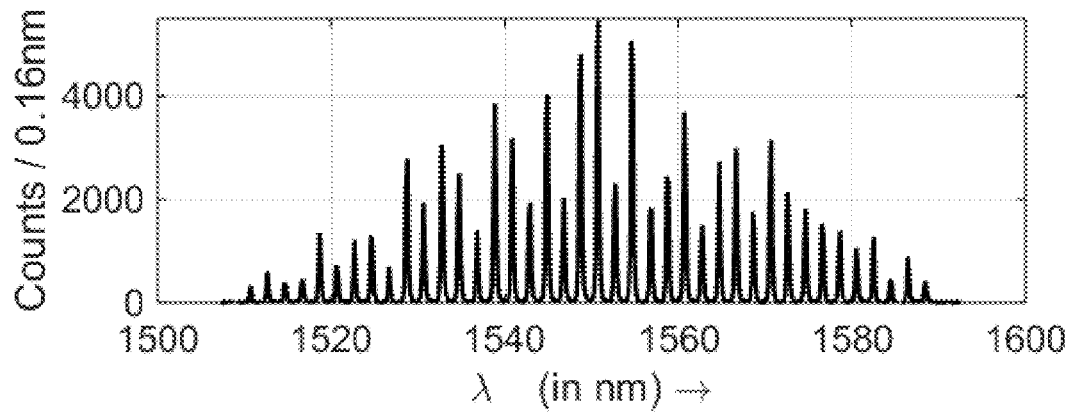
Figure 7:
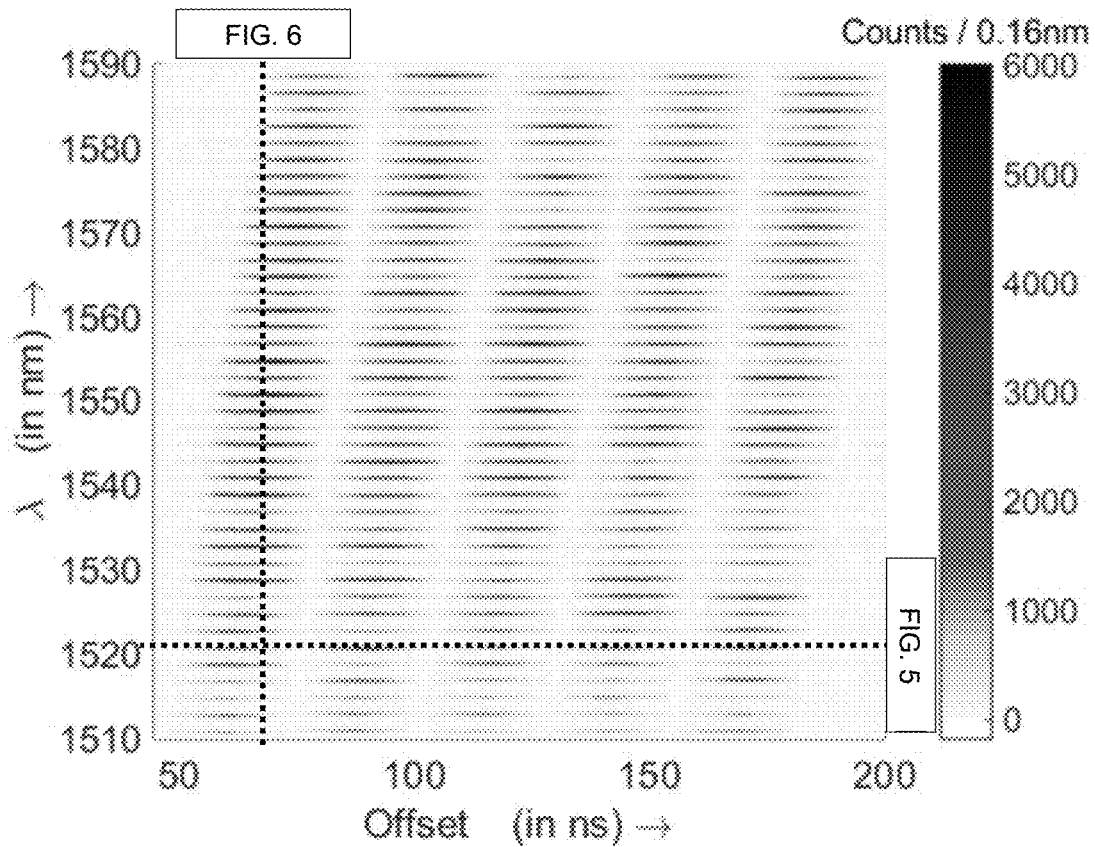

Now, FIG. 6 shows a whole WDM section for a time delay of 68.5 ns. Sensors closer to the edge of the section are attenuated by the convolution triangle, as mentioned before. Four other time delays are sufficient to analyze the other WDM sections of the sensor network 1. FIG. 7 shows a measurement of the whole sensor network 1 with 200 sensors (40 serial FBGs per WDM section). Several time delays are measured and depicted. The two black dotted lines indicate the part of the measurement that is depicted in FIGS. 5 and 6.

Figure 8:
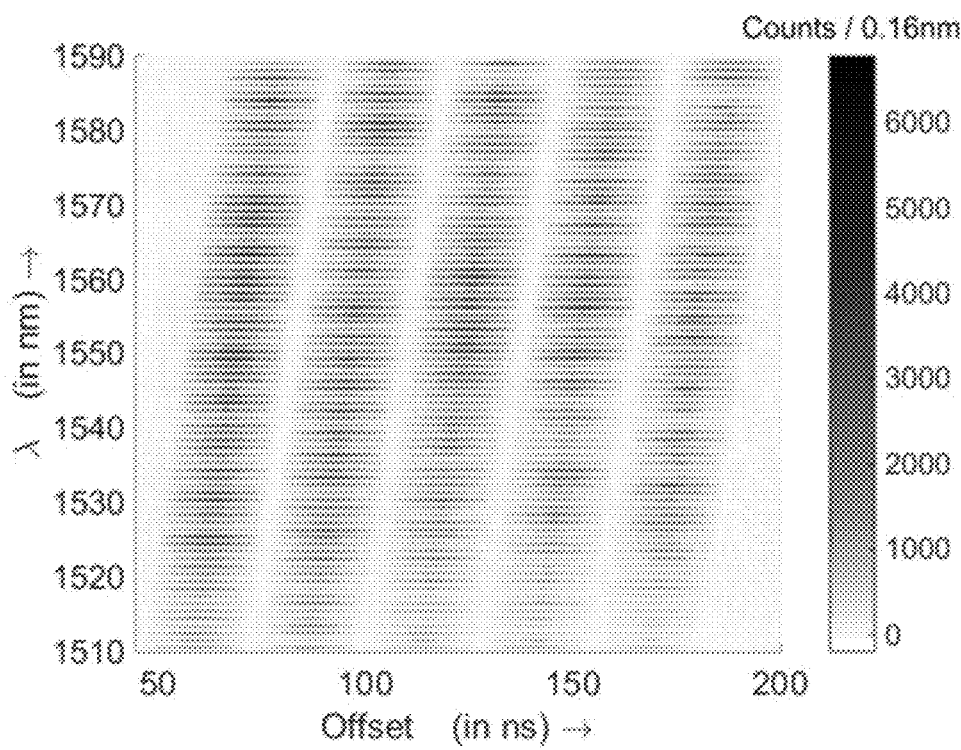

FIG. 8 shows the whole measurement of the sensor network 2 with 400 serial sensors. The interrogation has the same settings as before (80 MHz chip rate and 23.857 ms integration time. In this network, 80 serial FBGs form a WDM section.

Figure 10:
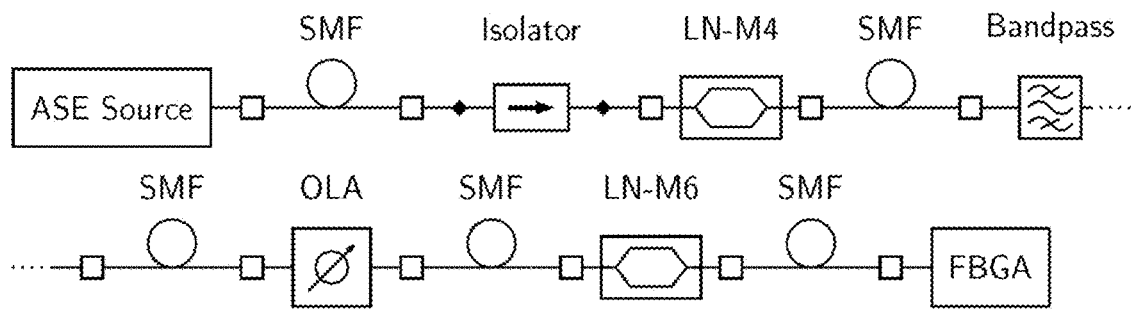
FIG. 10 illustrates a setup for investigating measurement limits of a system as used for obtaining experimental results.
Figure 11:
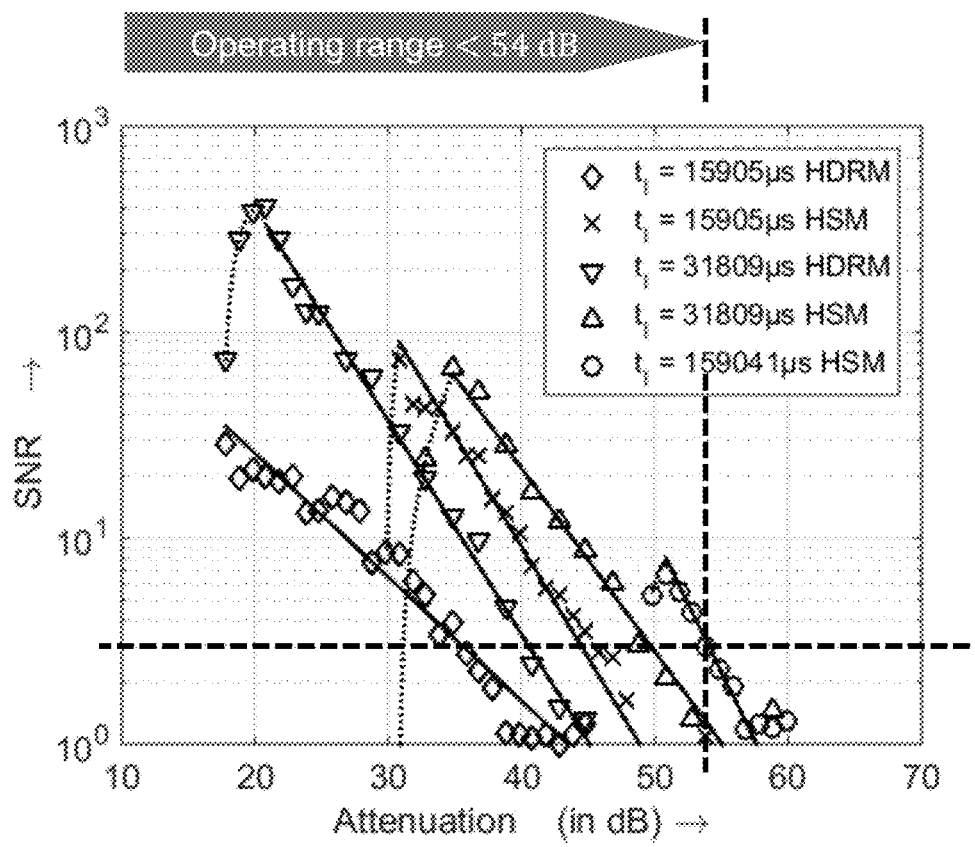
FIG. 11 to FIG. 14 illustrate measurement results illustrating the limits of the interrogation system according to an embodiment of the present invention.

The maximum size of the sensor network is limited in different ways, an evaluation thereof being discussed below. The maximum number of sensors in a serial network relies on their reflectance value. An example of a measurement system for evaluating is shown in FIG. 10. Measurements of the power limit are depicted in FIG. 11. A bandpass filter with an equivalent spectral width as the FBG and an optical attenuator (OLA) replace the sensor network with a circulator. The bandpass is used to compare signal and noise power. A signal to noise ratio (SNR) is calculated for each attenuation in a range from 18 dB to 65 dB. The filter itself attenuates by ~15 dB that is added to the adjusted attenuation.

FIG. 11 shows the results of the dynamic measurement. Three different integration times are analyzed in two different acquisition modes of the spectrometer; a high dynamic range mode (HDRM) and a high sensitive mode (HSM). The SNR is plotted against the attenuation. Considering at least an SNR of 3, so the signal is three times the maximum noise value, a limit of 54 dB is stated. Higher integration times increase the noise until it reaches the saturation limit of the spectrometer. In the saturation region no proper measurements can be realized. When the attenuation is decreased, the peak value of the spectra acquired to calculate the differential spectrum eventually reaches the saturation level. Subtracting two saturated values would result in a zero in the differential spectrum.

Taking 54 dB as a maximum attenuation into account, the maximum amount of WDM sections in this setup can be estimated. The attenuation of light in the sensor network is directly dependent on the reflectance of each FBG. The attenuation of the fiber itself needs to be added which decreases the amount of FBGs to be interrogated.

$$a_R = 10 * \log\left(\frac{1}{(1-R)^{2n-2}R}\right) + 2l \cdot a_o < 54 \text{ dB} \quad [1]$$

$$\Leftrightarrow n = \frac{1}{2}\left(2\frac{\frac{a_r - 2l \cdot a_0}{10} + \log(R)}{\log(1-R)}\right) \quad [2]$$

Figure 12:
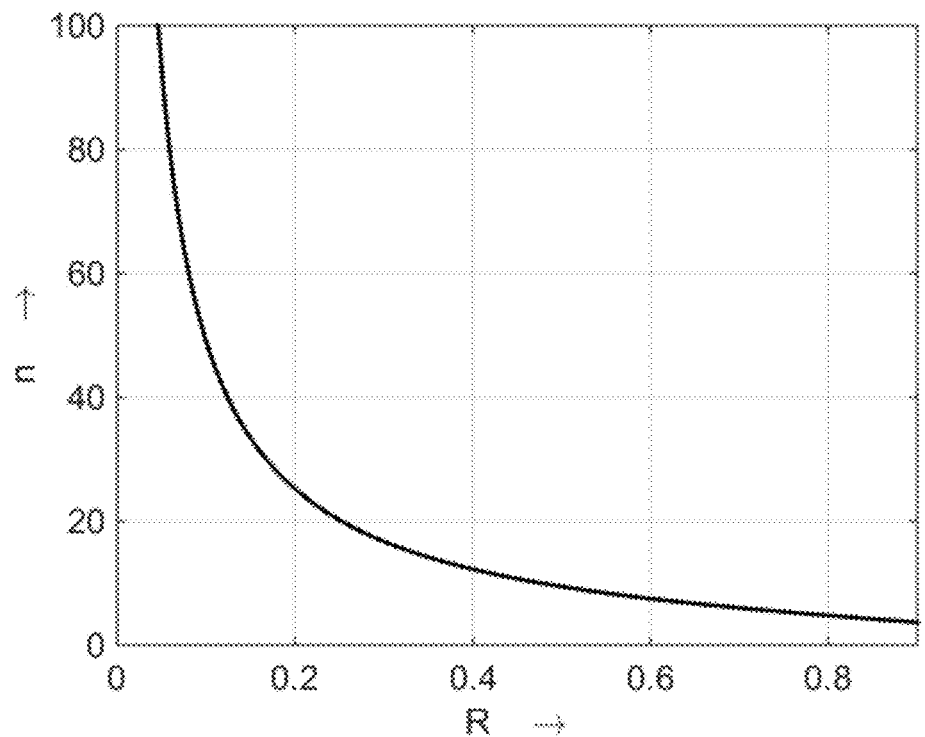

Equation [1] shows the relation between reflectance R and attenuation aR of the whole network. For example, the reflected light from the third group needs to pass the first and the second group, then it is reflected and it passes the second and the first group again. It is an exponential relation. In FIG. 12, the maximum number of segments n is plotted over the reflectance according to Equation [2]. Assuming a reflectance of 20%, a total amount of ~25 segments can be achieved. With 80 sensors per WDM segment, 2000 serial FBGs are investigated by the means of this interrogator testbed.

Figure 13:
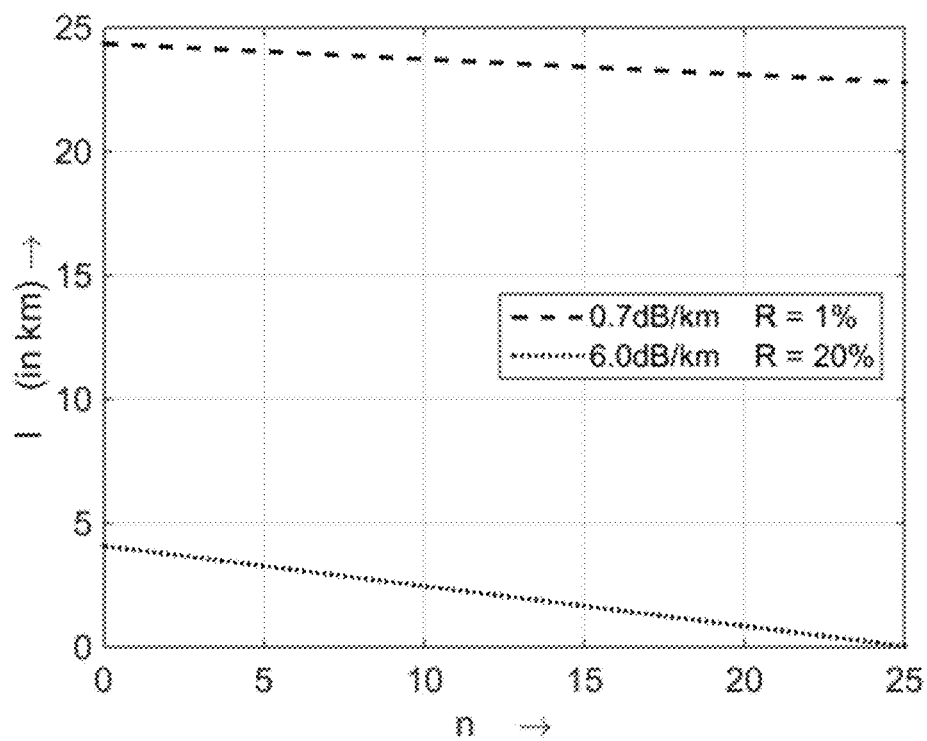

Regarding the dimension of the sensor network, particularly Draw Tower Gratings (DTG®s) offer a very high sensor density with an FBG separation in the centimeter range which forms the lower dimension limit. On the other hand, the maximum sensor network length l depends on the attenuation per kilometer of the fiber itself. It is represented with the variable a0 in the formulas. FIG. 13 shows the dependency of the fiber length l on the number of WDM sections n for two typical draw tower FBG sensor fibers.

Figure 14:
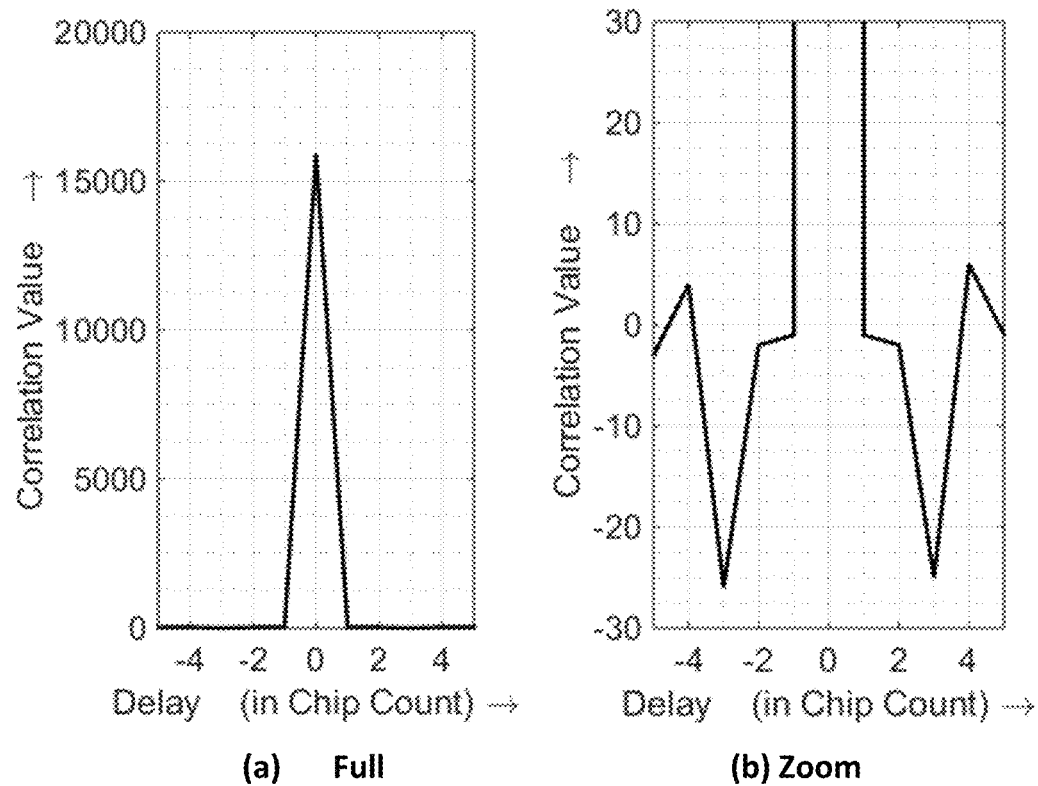

As mentioned before, a code with a length of 31808 chips is used for all measurements. Its correlation is depicted in FIG. 14. The previous described triangle can be seen in FIG. 14 part a. A zoom is performed in FIG. 14 part b so that the multi WDM interferences are visible. Each point of the correlation function is a shift of multiples of a chip length. The triangular shape is a result of the convolution of two high-state chips with an equal ON-time for both chips. Due to the triangle function, sensors at the edge of the measured set of sensors have a lower signal level.

Figure 20:
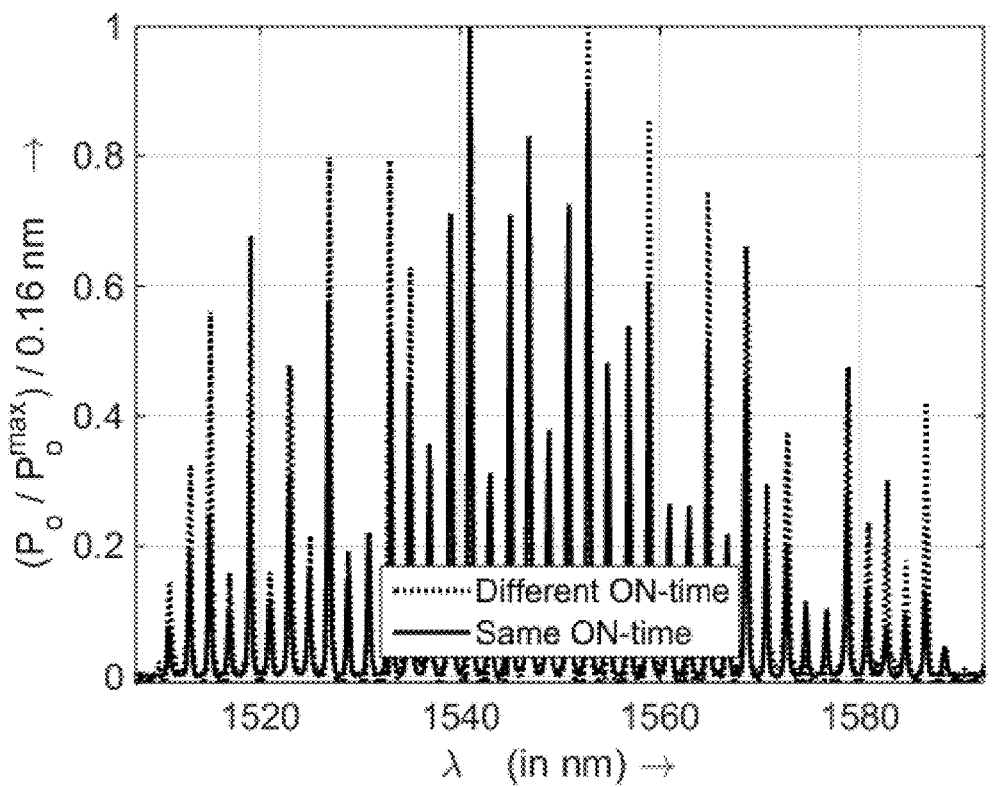
FIG. 20 illustrates an example of a result of an improved chip configuration.

This effect can be reduced by for example shortening the ON-time within a high-state chip for the first modulator compared to the ON-time within a high-state chip for the second modulator, as depicted in FIG. 15. In this way, the correlation function is modified to a trapezium. The corresponding lower peak/plateau height, as shown in FIG. 16, can be compensated by adjusting the integration time of the spectrometer. A similar result can be obtained by shortening the ON-time within a high-state chip for the second modulator compared to the ON-time within a high-state chip for the first modulator. FIG. 20 shows an example of how the detection at the edges of a selected set of sensors improves in case the ON-time in the high-state chip of the second modulator is no longer equal to the ON-time in the high-state chip of the first modulator (solid plot) but now 5 times shorter than the ON-time in the high-state chip of the first modulator (dotted plot). It can be clearly seen that in the latter case (dotted plot) the intensity of the sensors at the edge of the selected set of sensors is improved.

The invention claimed is:

1. A system for interrogating sensors in a fiber optical sensor network, the fiber optical sensor network comprising several groups of sensors, wherein the sensors in one group are operating at different wavelengths and the sensors of different groups may have overlapping wavelengths, the system comprising:
   a light source for generating a broadband light signal, the broadband light signal spanning a wavelength range, so that the broadband light signal is suitable for activating a response of the sensors to be measured within the fiber optical sensor network,
   an input and output means for guiding the broadband light to the fiber optical sensor network for illuminating the sensors and for coupling the light signal coming from the sensors of the fiber optical sensor network to the detection system,
   a detection system for detecting the received light signal, during a detection integration time, the system being arranged for selecting pre-dominantly the received light coming from the different sensors of a selected group of sensors using a code-division multiplexing technique and the system being arranged for simultaneously detecting sensors of the selected group of sensors using a wavelength-division multiplexing technique and for deriving based thereon a measurement of the sensor response of sensors of the selected group of sensors.

2. The system according to claim 1, wherein the sensors are Fiber Bragg Gratings.

3. The system according to claim 1, wherein the system comprises:
   a first modulator for modulating the light intensity coming from the light source using a first modulation according to a predetermined code comprising a plurality of identifiable chips having a well-defined chip duration and with the chips defining a low-state or a high-state, such that in a high-state more light is transmitted than in a low-state, and
   a second modulator for modulating the light signal coming from the sensors of the fiber optical sensor network after passing the output means with a second modulation according to a second predetermined code with the same chip duration as used for the first modulator, the second predetermined code being interdependent on the first predetermined code,
wherein the ON-time of the high-state chip of the first modulation and the ON-time of the corresponding high-state chip of the second modulation are such that pre-dominantly the received light of the selected group of sensors will pass the second modulator.

4. The system according to claim 1, wherein using a code division multiplexing technique comprises using a different correlation response for a specific time delay setting for each of the several groups of sensors, between signals in the code division multiplexing technique.

5. The system according to claim 1, wherein the system is arranged for deriving a measurement of the sensor response of sensors of other selected groups using a code-division multiplexing technique.

6. The system according to claim 3, wherein the second predetermined code is time-shifted with respect to the first modulation,
wherein the time delay, the ON-time of the high-state chip of the first modulation and the ON-time of the corresponding high-state chip of the second modulation are such that pre-dominantly the received light of the selected group of sensors will pass the second modulator, or
wherein the second predetermined code is substantially the same as the first predetermined code, having the same chip duration and the same sequence of chips as in the first modulation.

7. The system according to claim 1, wherein at least one group of sensors furthermore comprises sensors operating at the same wavelengths.

8. The system according to claim 1, whereby the selected group of sensors have at least partly similar wavelength responses as other sensors in the fiber optical sensor network.

9. The system according to claim 3, wherein the sum of the duration of the ON-time within a high-state chip for the first modulator, and the ON-time within a corresponding high-state chip for the second modulator is larger than the time delay between the detection of the sensor response of the first sensor of the selected group of sensors and the detection of the sensor response of the last sensor of the selected group of sensors.

10. The system according to claim 3, whereby the duration of the ON-time within a high-state chip for the first modulator, and the ON-time within a corresponding high-state chip for the second modulator is smaller than the time delay between the detection of the sensor response of the last sensor of the sensors preceding the selected group of sensors and the detection of the sensor response of the first sensor of the sensors following the selected group of sensors.

11. The system according to claim 3, wherein the system is furthermore adapted for adapting the second modulator for modulating, in a second detection integration time, the received light signal using said second predetermined code, but time-shifted with a second time-delay depending on a travel time of the light signal to and from the plurality of sensors of a second selected group of sensors, so as to select in said second modulator contributions in the received light signal of said second selected group of sensors and so as to detect in the detection system responses of said plurality of sensors of said second selected group of sensors for deriving a sensor response for each of the plurality of sensors of the second selected group of sensors.

12. The system according to claim 3, wherein a plurality of codes are applied subsequently during a same detection integration time and
wherein the system is adapted for varying the time-delay during the detection integration time over a time span depending on the detection time of the response of the first detected sensor of the selected group of sensors and the detection time of the response of the last detected sensor of the selected group of sensors.

13. The system according to claim 3, wherein a part or all of the received light signal coming from the sensors from the sensor network is modulated with a third modulation according to a third code corresponding with the second predetermined code, but
wherein the state of the code chips has been inversed to the other state, the third code being time-shifted with the same time-delay as the second modulation if any,
the processing system is configured for measuring the difference between the detected wavelength spectra measured using the second pre-determined code and the inverse code, and for deriving based thereon a sensor response for each of the plurality of sensors of said selected group of sensors.

14. The system according to claim 3, wherein the system is furthermore having several sets of modulators and detection systems working in parallel whereby each set is operated using a different time-delay such that different selected groups of sensors are read-out simultaneously.

15. The system according to claim 1, wherein the system is measuring the fiber optical sensing network in reflection.

16. The system according to claim 1, wherein the system is measuring the fiber optical sensing network consisting of different WDM sections in transmission,
wherein each of the WDM sections are put in parallel using an optical coupler and whereby the transmitted signals are coupled again together into one fiber in a way that time delays are introduced between the detection of the different WDM sections.

17. An optical system comprising a fiber optical sensor network and a system for interrogating a fiber optical sensor network according to claim 1.

18. A method for interrogating sensors in a fiber optical sensor network, the fiber optical sensor network comprising several groups of sensors,
wherein the sensors in one group are operating at different wavelengths and the sensors of different groups may have overlapping wavelengths, the method comprising:
generating a broadband light signal, the broadband light signal spanning a wavelength range, so that the broadband light signal is suitable for activating a response of the sensors to be measured in the fiber optical sensor network,
guiding the broadband light to the fiber optical sensor network for illuminating the different sensors in the fiber optical sensor network and for coupling the light signal coming from the different sensors of the fiber optical sensor network, to the detection system,
pre-dominantly selecting the received light coming from the different sensors of a selected group of sensors using code-division multiplexing technique,
simultaneously detecting sensors of the selected group of sensors using a wavelength-division multiplexing technique,
deriving based thereon a measurement of the sensor response of the sensors of the selected group of sensors.

19. The method according to claim 18, wherein the method comprises modulating the light signal using a first modulation according to a predetermined code comprising a plurality of identifiable chips having a well-defined chip duration,
> wherein the chips have a low state or a high state, such that in a high state more light is transmitted than in a low state, and
>
> modulating the light signal received from said fiber optical sensor system with a second modulation according to a second predetermined code with the same chip duration as used for the first modulator, the second predetermined code being interdependent on the first predetermined code, wherein the ON time of the high state chip of the first modulation and the ON time of the corresponding high state chip of the second modulation are such that pre-dominantly the received light of the selected group of sensors will pass the second modulation.

20. The method according to claim 19, wherein the second predetermined code is time-shifted with respect to the first modulation,
> wherein the time delay, the ON-time of the high-state chip of the first modulation and the ON-time of the corresponding high-state chip of the second modulation are such that pre-dominantly the received light of the selected group of sensors will pass the second modulator.

* * * * *